April 2, 1968    M. O. HOLTAN    3,375,737
TRANSAXLE
Filed Jan. 28, 1966    3 Sheets-Sheet 3
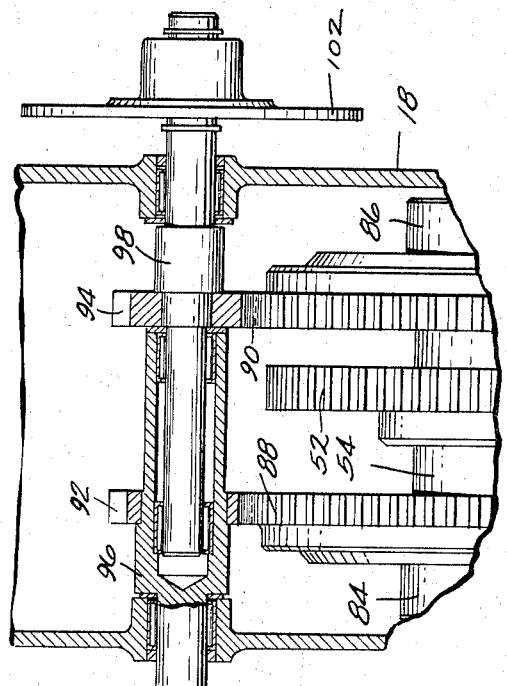
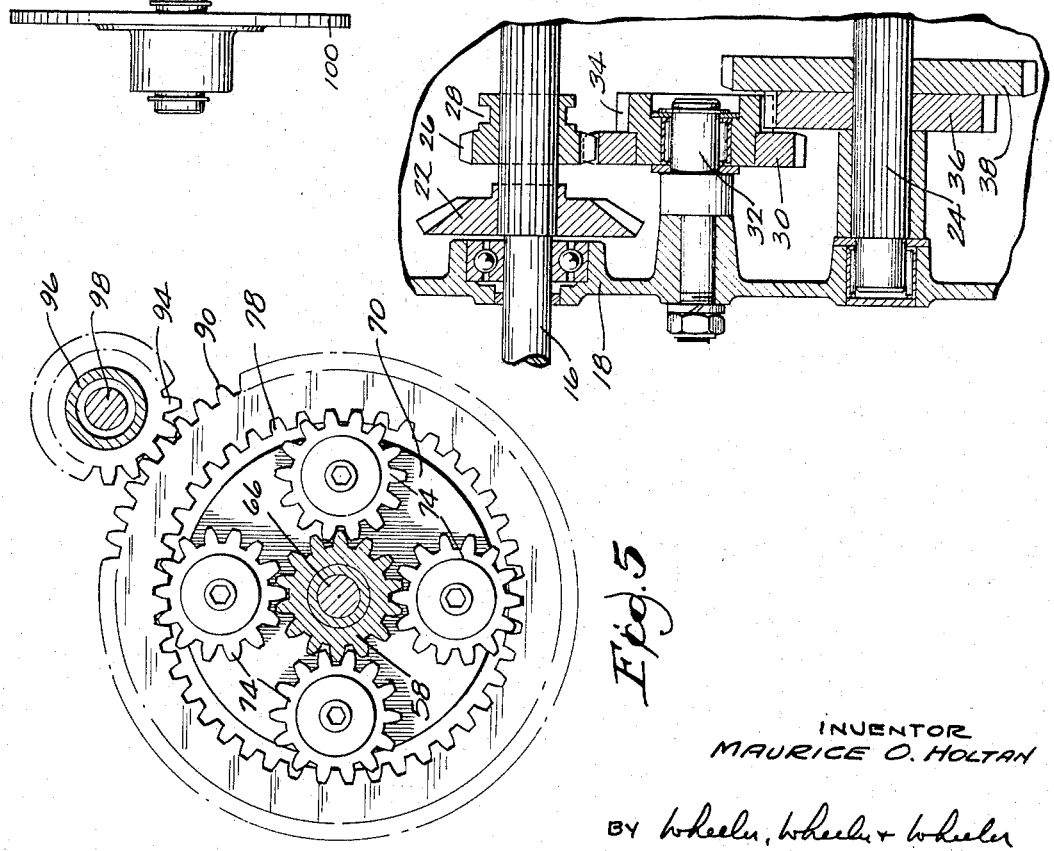
INVENTOR
MAURICE O. HOLTAN
BY Wheeler, Wheeler & Wheeler
ATTORNEYS

United States Patent Office 3,375,737
Patented Apr. 2, 1968

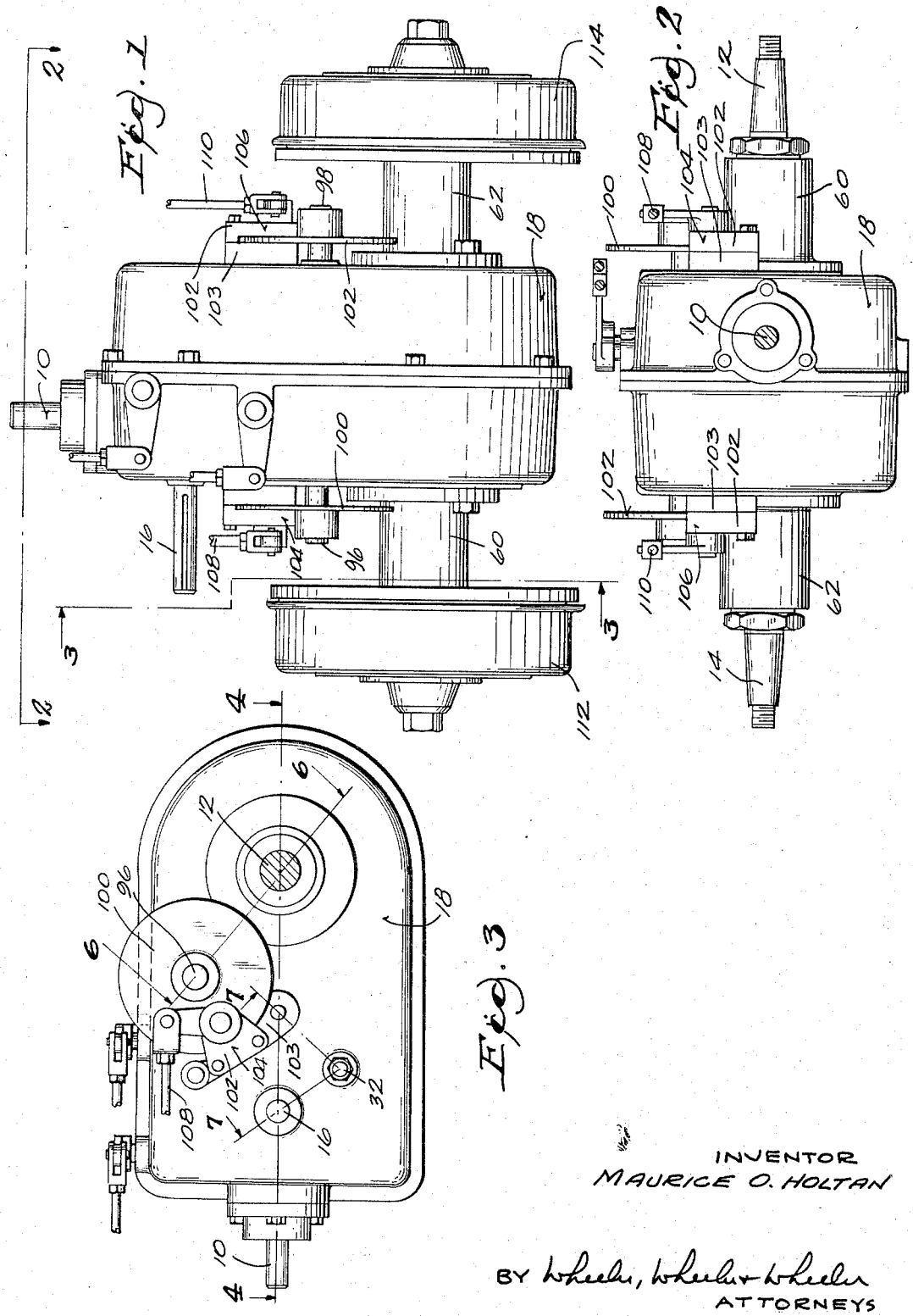

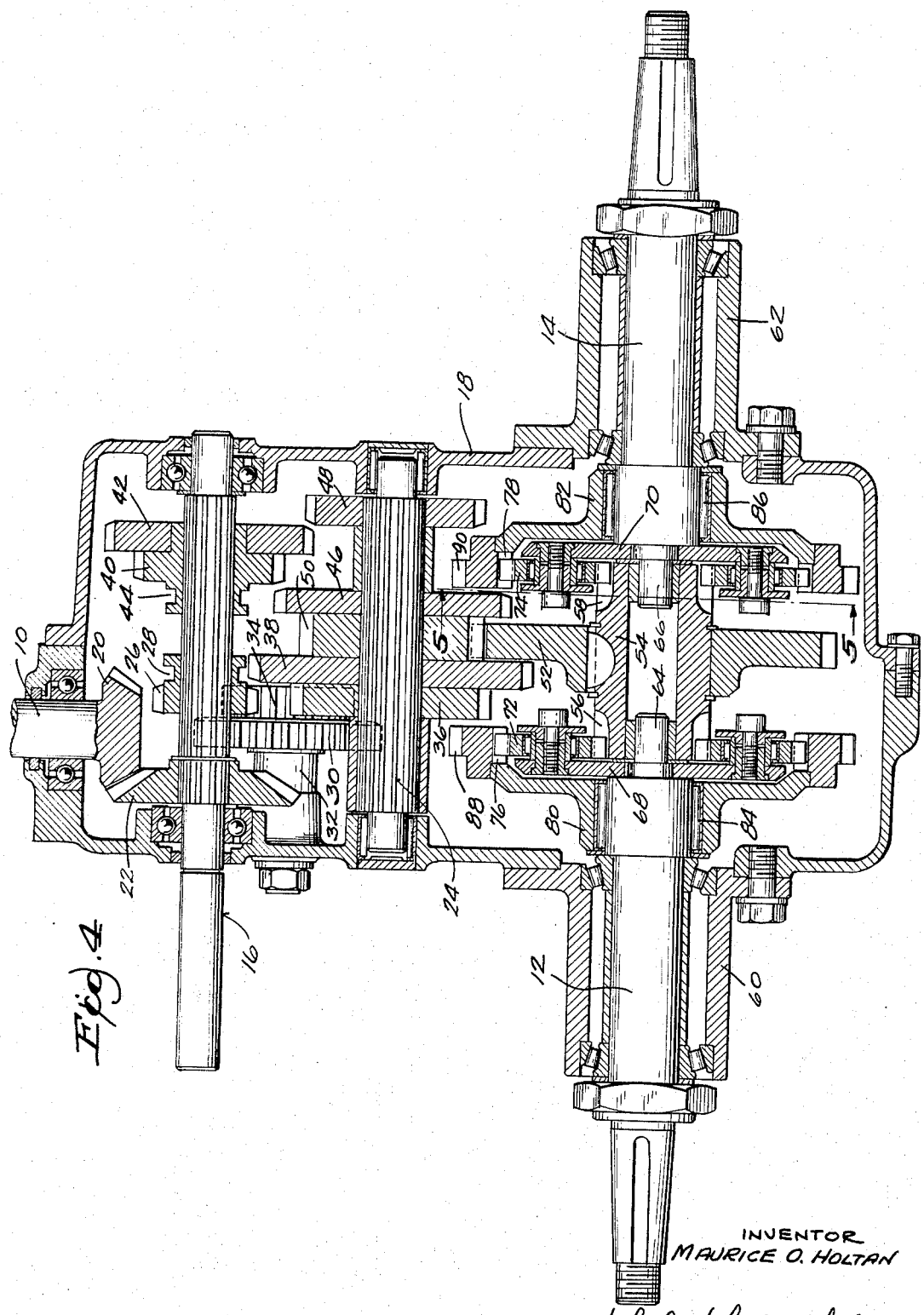

3,375,737
TRANSAXLE
Maurice O. Holtan, 2012 Menomonee River Parkway,
Wauwatosa, Wis. 53213
Filed Jan. 28, 1966, Ser. No. 523,647
13 Claims. (Cl. 74—720.5)

ABSTRACT OF THE DISCLOSURE

A transaxle combination comprising a change speed set on one shaft, mutually aligned driven shafts being driven by planetary gearing, the planetary gearing being driven by the change speed set through a shaft coaxially aligned and separate from the driven shafts and selective brake actuated means mounted on another shaft for coupling the driven shafts to the change speed set, all of the shafts being mounted in parallelism.

This invention relates to a transaxle.

The invention has for its objects the provision of a combination transmission and planetary driven shaft assembly which is more compact and less expensive to manufacture than other transaxle devices and has other advantages in that the control of the power to one axle, or the other axle, or to both axles is done with a small amount of effort and the control brakes for the planetary transmissions are outside of the casing where they can readily release heat by radiation and are easily serviced.

In the preferred embodiment shown, a pair of planetary transmissions are coaxial with the driven shafts. The respective sun gears are interconnected and constitute the driving elements of the respective planetaries. The planet carriers constitute the output members through which power is transmitted to the driven shafts. The planet gears mesh with internal teeth, on ring gears also having external teeth for driving respective jack shafts carrying external brake disks with which caliper brake mechanisms interact, subject to the control of the operator, to leave the ring gears free or to arrest their motion at will. Other types of brakes such as internal expanding or external wrap-around brakes may be used instead of disk brakes with caliper brake mechanisms.

A very important feature of the invention consists in the arrangement whereby the control exerted by the caliper brake disks on the planetaries is effected through reduction gearing, the whole arrangement permitting such control to be effected frictionally with relatively light brakes and with very smooth braking action. Planetary transmissions of this general type which have previously been known to me have tended to grab so that their operation has been rough and not controlled smoothly.

Compactness results from an arrangement whereby a common drive gear mounted on the hubs of the respective sun gears lies between gear pairs on the driven shaft of the change speed mechanism, said change speed driven shaft being parallel to the aligned output shafts of the assembly.

The principal speed reduction of this unit is obtained through the planetary gearing which is the final gear set in the gear train immediately ahead of each drive axle.

In each planetary gear set the actuating members controlled by the brakes on the outside are stationary when power is flowing through the unit to the axle shafts.

The sliding gears of the change speed mechanism are mounted on a shaft which is also parallel with the driven shafts. Location of the braking jack shafts at one side of the central plane of the transaxle and the reverser jack shaft at the other side of said plane likewise contributes to compactness. Both shafts in the change speed gearing, both jack shafts, and both of the output axle shafts are all parallel to each other.

In the drawings:

FIG. 1 is a plan view of a transaxle embodying the invention.

FIG. 2 is a front elevation thereof.

FIG. 3 is a view taken on the line indicated at 3—3 in FIG. 1.

FIG. 4 is a detail view in cross section on the line 4—4 of FIG. 3.

FIG. 5 is a detail view taken in section on the line 5—5 of FIG. 4.

FIG. 6 is a fragmentary view taken in cross section on the line 6—6 of FIG. 3.

FIG. 7 is a fragmentary view taken in cross section on the line 7—7 of FIG. 3.

The disclosed embodiment of the invention is designed for use in a tractor of the track-laying type having a power input drive shaft 10, axle shafts 12 and 14 and two shafts of a change speed transmission. However the invention is not limited to this usage. The said shafts and motion transmitting connections between them are mounted within a housing 18 which is conveniently made in two parts bolted together as best shown in FIGS. 1 and 2 upon a center line normal to the axes of the several shafts.

Within the housing 18 the shaft 16 is splined and constitutes the driving shaft of the change speed transmission. The shaft 16 may optionally project for power take-off. Bevel gears at 20 and 22 transmit motion from the power input shaft 10 to the shaft 16. The splined driven shaft 24 of the change speed transmission is intermediate shaft 16 and the output shafts 12 and 14, all of said shafts lying in the same plane, as shown in FIG. 4.

In the change speed transmission the splined shaft 16 carries a slidable gear 26 which is shown in neutral position in FIG. 4 and has the usual channel at 28 for a shifting fork (not shown). If the gear 26 is shifted to the left, as viewed in FIG. 4, it meshes with a reverse gear 30 which rotates on a fixed axle 32 offset from plane 4 as shown by FIG. 7. (See the line 7—7 of FIG. 3.) Fixed to the gear 30 is a gear 34 which meshes with gear 36 on shaft 24. If the gear 26 is shifted to the right as viewed in FIG. 4, then it meshes with gear 38 on shaft 24 without any intermediate gear. Thus, according to whether the gear 26 meshes with gear 30 or the gear 38 the shaft 24 will be driven in one direction or the other in relation to the shaft 16. The gear 26 is used for reverse drive in the first described position and for low speed drive in the second described position.

Likewise mounted for sliding movement on the splined shaft 16 is a gear pair which comprises a relatively small gear 40 and a larger gear 42. These two gears may be shifted concurrently by operation of a shipping fork (not shown) on the channeled collar 44. If the gear 40 is moved to the left from the neutral position illustrated in FIG. 4, it will mesh with gear 46 on shaft 24 to drive that shaft at an intermediate speed. If the gear pair is moved to the right to engage gear 42 with gear 48, the shaft 24 will be driven at a higher speed with regard to shaft 16. While the change speed shifting gear is not per se a part of the invention, its components cooperate in a novel manner with the planetaries presently to be described.

A gear 50 disposed between gears 38 and 46 on shaft 24 meshes with a driving gear 52 for two planetary systems. Gear 52 is keyed to a hub 54 which carries two sun gears, one of which is designated 56 and the other 58. These sun gears constitute the driving elements of two planetary assemblies which are spaced just sufficiently to accommodate the several gears 36, 38, 50 and 46 carried by shaft 24 of the change speed transmission.

The output shafts 12 and 14 are provided with heavy bearings which, in the instant exemplification, mount them in fixed axles 60 and 62, respectively. These axles have flanges bolted to the housing 18 as shown. The hub 54 which carries the driving gear 52 is piloted by appropriate bushings on the reduced inner ends 64 and 66 of the respective live axles which here constitute output shafts 12 and 14.

Keyed, splined or otherwise fixed to the shafts 12 and 14 respectively are the planetary carriers 68 and 70 by which the shafts are driven. The planet gears 72, 74 mounted on the respective carriers 68 and 70 mesh with respective sun gears 56 and 58 and also mesh with the internal teeth of respective ring gears 76, 78. The ring gears are respectively supported from hubs 80 and 82 journaled by appropriate bearings 84 and 86 on the shafts 12 and 14 respectively. The ring gears are capable of rotating freely with respect to the shafts except as restrained by manually releasable brakes now to be described.

The ring gears 76, 78 not only have internal teeth with which the planets 72 and 74 are in mesh, but they have external teeth 88 and 90 which respectively mesh with gears 92 and 94 on jack shafts 96, 98. The jack shafts are piloted upon each other, the arrangements being best illustrated in FIGS. 5 and 6. The jack shafts project through appropriate bearings in the housing 18 and respectively carry brake disks 100 and 102 outside the housing in positions where they can conveniently be acted upon by caliper brakes generically designated by reference characters 104 and 106 respectively. Manually operable links 108 and 110 actuate the respective brakes. These normally hold the disks 100 and 102 stationary by clamping them between opposing surfaces of the parts 102 and 103 of the caliper brakes (FIGS. 1 and 2), thereby fixing the positions of the ring gears 76, 78 to require the output shafts 12 and 14 to rotate as the driving sun gears 56, 58 rotate the planet gears 72 and 74 to drive the planet carriers 68 and 70 connected with said shafts.

Just as the jack shaft 32 of the change speed transmission is offset at one side of the central plane 4—4 (FIG. 3) the jack shafts 96, 98 of the respective brake disks 100 and 102 are offset at the opposite side of said plane, where there is no interference with the gears of the change speed mechanism. Thus the assembly of gears in housing 18 is extremely compact.

The location of the caliper brakes outside of the housing is very advantageous because any tendency of the brakes to overheat is minimized by radiation from the disks in the exposed positions shown. It may further be noted that the caliper brakes can be relatively light because of the mechanical advantage they have in operating on the ring gears through the relatively small gears 92 and 94 meshing with the teeth 88 and 90 on the much larger radii of the respective ring gears.

In practice, assuming that the transaxle is used on a track-laying vehicle, the track-laying sprockets or wheels, as the case may be, will be mounted on the driven shafts 12 and 14. The wheels themselves are not shown but conventional drum type vehicle brakes are illustrated at 112 and 114 in FIG. 1. In conventional practice, the vehicle supporting parts are mounted on these. With the caliper brakes set to hold the brake disks 100 and 102 stationary, the ring gears 76 and 78 will likewise be stationary. The planetary pinions 72, 74 will roll about the interiors of the respective ring gears causing the respective planetary carriers 68 and 70 to rotate and thereby to drive output shafts 12 and 14. If these are axle shafts they will propel the vehicle.

When it is desired to make a turn, the caliper brake on the side to which the vehicle is to turn is released in whole or in part so that the disk on that side of the vehicle will be allowed to turn and the wheels or track on that side of the vehicle will be retarded or stopped. Inasmuch as no power will then be transmitted to that side of the vehicle, the turn will be effected. To assist in turning, the vehicle brake on that side of the vehicle should be applied after the power brake (caliper disk brake) has been disengaged. The power engagement brake and the vehicle brake are usually connected together to one control lever. There is a separate control lever for the brakes on each side of the vehicle. When the control lever is in a forward position it engages the power control brake, when it is in a middle position it is neutral, and when the lever is pulled to the rear, it engages the vehicle brake. Therefore, when both control levers are in a forward position the vehicle is moving in the speed and direction in which the gear changing gears are engaged. When the two control levers are in the center position the vehicle is at a neutral or at rest position. When the two control levers are to the rear, the vehicle is in a stopped position with the vehicle brakes applied. When one lever is in a forward position and the other lever is in a rear position, the vehicle is turning in the direction of the lever in the rear position. These levers allow the operator to feather the engagement of brakes to steer the vehicle, as well as power to drive the vehicle and to stop the vehicle.

The caliper brakes and disks, operating through the reduction gearing as shown, are very smooth in their functioning and enable control to be exerted without jerking. The arrangement further operates to absorb shock throughout the transaxle.

To meet different power requirements, it is easily possible to change gear ratios and load capacities merely by substituting gears of different dimensions.

I claim:

1. A transaxle comprising the combination with a change speed gear set having power input and output shafts and change speed gears thereon, of driven shafts aligned with each other and in parallelism with the shafts first mentioned, planetary transmissions having meshing sun and planet and third gear elements, each of said transmissions including a driving rotor constituting one said element and connected with said gear set output shaft, the respective planetary transmissions each including a driven rotor constituting a second of said elements and individually connected with a respective driven shaft, each of the respective planetary transmissions further including a rotor constituting a third said element and normally stationary to require transmission of motion from said first element to driven shafts and individually rotatable for interruption of motion transmission, and separate brake means for controlling rotation of the last mentioned elements of respective planetary transmissions.

2. A transaxle according to claim 1 in which reduction gearing independent of power transmission between said input and driven shafts connects the respective brake means with the respective last mentioned elements.

3. A transaxle according to claim 2 in which the said gears and planetary transmissions are enclosed and the brake means comprise caliper brakes having exposed brake disks and cooperating frictional clamping means.

4. A transaxle according to claim 1 in which sun gear elements of the respective planetary transmissions are operatively connected to said change speed gear set output shaft to receive motion therefrom, each of said planetary transmissions having a planet carrier constituting said second element and respectively connected with one of said driven shafts, the third element of each said planetary transmission comprising a ring gear.

5. A transaxle according to claim 4 in which the ring gear has means for supporting it for rotation coaxially with said driven shafts, reduction gearing operatively connected with each ring gear, said brake means including a brake disk operatively connected through said gearing with each ring gear, and caliper clamp means selectively engageable separately with respective disks.

6. A transaxle comprising a change speed gear set having power input and output shafts and change speed gears thereon, mutually aligned driven shafts, planetary transmission means individual to said output shafts and including brake actuated means for selectively coupling the driven shafts to said output shaft to be driven therefrom, all of said shafts being parallel and in a common plane, the brake means for selective coupling including transmission brake shafts operatively connected with respective transmissions and offset at one side of said plane, and the change speed gear set including a reversing gear offset at the other side of said plane.

7. A transaxle according to claim 6 in which a casing encloses said gears and transmissions and at least portions of said shafts, the brake shafts projecting from the casing and being provided externally of the casing with separate caliper brake means.

8. A transaxle according to claim 6 in which said brake shafts having reduction gearing coupling them individually with normally fixed components with which the said planetary transmissions are respectively provided.

9. The combination with aligned driven shafts, of a driving hub coaxial therewith and provided with sun gears adjacent the ends of respective shafts, a planet carrier connected with each shaft and having planet gears meshing with respective sun gears, a ring gear encircling each planet carrier and having internal teeth with which the respective planet gear mesh, means for rotatively supporting the respective ring gears coaxially with respective shafts and separately releasable brake means for normally holding the respective ring gears against rotation, reduction gears meshing with said ring gears and having motion transmitting connections including separate brake shafts through which said brake means act on respective ring gears.

10. A combination according to claim 9 in which said brake means comprise disks on said shafts and caliper friction elements selectively clampable frictionally upon said disks.

11. A transaxle comprising the combination with a housing and aligned driven shafts having bearings supported therefrom, said shafts having ends within the housing, a hub member mounted on said ends and provided with sun gears encircling said ends, a driving gear on the hub member between the sun gears, planet carriers connected with respective shafts and having planet gears meshing with respective sun gears, a ring gear encircling and meshing with each of said planet gears and mounted rotatably on respective shafts within the housing, a change speed transmission in said housing having input and output shafts, the latter being parallel to said driven shafts and having thereon one gear meshing with said driving gear and other gears of a radius and position to project between the said driving gear and respective ring gears, the said transmission including change speed gears shiftable axially of said input shaft to and from selective mesh with the last mentioned gears on the output shaft, and means for selectively braking and releasing respective ring gears.

12. A transaxle according to claim 11 in which said braking means includes respective brake disks mounted outside of said housing on shafts having portions within the housing and having reduction gears operatively connecting them with respective ring gears, and brake members outside of the housing and selectively engageable frictionally with respective disks.

13. A transaxle according to claim 12 in which each of said brake members is a caliper brake means.

References Cited
UNITED STATES PATENTS

| | | | |
|---|---|---|---|
| 2,377,354 | 6/1945 | Merritt | 74—701 X |
| 2,465,832 | 3/1949 | Banker | 74—701 |
| 2,638,797 | 5/1953 | Gross | 74—710.5 |
| 3,050,164 | 8/1962 | Bowen et al. | 74—720.5 X |
| 3,137,182 | 6/1964 | Berchtold et al. | 74—720.5 |
| 3,308,673 | 3/1967 | Gardner | 74—701 X |

DONLEY J. STOCKING, *Primary Examiner.*

ARTHUR T. McKEON, *Examiner.*